United States Patent Office 3,629,358
Patented Dec. 21, 1971

3,629,358
TOUGH UNSUPPORTED FILMS FORMED FROM ORGANOPOLYSILOXANES
Harry F. Lamoreaux, Schenectady, and Frank J. Modic, Scotia, N.Y.; said Lamoreaux assignor to General Electric Company
No Drawing. Continuation of application Ser. No. 514,371, Dec. 16, 1965. This application July 2, 1969, Ser. No. 845,606
Int. Cl. C08g 47/04, 47/06
U.S. Cl. 260—825          3 Claims

ABSTRACT OF THE DISCLOSURE

Silicone films having a tensile strength in excess of 900 p.s.i. contain polydiorganosiloxane chains having at least 2500 diorganosiloxy units cross-linked through cross-linking polysiloxane blocks consisting of $R_3SiO_{0.5}$ units and $SiO_2$ units. The film is formed by condensing a resinous copolymer of $R_3SiO_{0.5}$ units and $SiO_2$ units with a silanol-terminated polydiorganosiloxane containing at least 2500 diorganosiloxane units. The films of the present invention are particularly useful in the manufacture of surgical gloves.

---

This application is a continuation of application Ser. No. 514,371 filed Dec. 16, 1965 now abandoned.

This invention relates to extremely tough films formed from organopolysiloxanes. The toughness referred to is a measure of both the tensile strength and the elongation value of the films. These tough silicone films, which have tensile strengths of greater than 900 p.s.i. and elongations of more than 150%, have a degree of toughness, defined as the quantity [0.5×(tensile strength)×(elongation)], of at least 100,000. The film is formed by condensing, with the aid of a catalyst, (1) a resinous copolymer of $R_3SiO_{0.5}$ units and $SiO_2$ units and (2) a silanol-terminated diorganosiloxane polymer.

Resinous copolymers composed of $R_3SiO_{0.5}$ units and $SiO_2$ units are well known in the art and are described, for example, in U.S. Pat. 2,857,356, Goodwin. One method of preparation is the hydrolysis of a hydrolyzable triorganosilane, such as trimethylchlorosilane, with an alkyl orthosilicate, such as ethyl orthosilicate, or the partial hydrolyzate of such an alkyl orthosilicate. During the cohydrolysis of these two materials in the presence of a mnior amount of water and in the presence of a suitable organic solvent, most of the silicon-bonded chlorine and the silicone-bonded alkoxy groups are replaced by silicon-bonded hydroxyl groups through which the two organosilicon materials condense to form siloxane linkages. The condensed copolymer is generally soluble in the organic solvent and insoluble in the water present in the hydrolysis reaction system, and the organic solvent layer therefore contains the resinous copolymer. This organic solvent layer containing the resinous copolymer is separated from the aqueous layer and, in some cases, is washed several additional times with water to provide the resinous copolymer in the organic solvent relatively free of either hydrochloric acid, which results from the hydrolysis, or the alkanol, formed by condensation during the hydrolysis. Depending upon the particular reaction conditions employed and the reactant ratio, these resinous copolymers of $R_3SiO_{0.5}$ and $SiO_2$ units contain from about 0.1 to 5%, by weight, of silicon-bonded silanol, or hydroxyl, groups.

In selecting the ratio of the triorganosilane to the alkyl orthosilicate which is employed in forming the resinous copolymer, the starting reactants are taken in the same ratio as the $R_3SiO_{0.5}$ units and $SiO_2$ units are desired in the final copolymer. For the present application of forming organopolysiloxane films which are extremely tough, the copolymer contains from about 0.77 to 1.0 $R_3SiO_{0.5}$ units per $SiO_2$ unit and, therefore, this same ratio of units, 0.77:1 to 1:1, is present in the starting materials.

The organic solvent used in the hydrolysis reaction which forms the resinous copolymer can vary within wide limits. In general, the solvent is either an aliphatic or aromatic hydrocarbon or a halogenated hydrocarbon since these solvents are the most readily available, commercially. Of particular use as solvents are benzene, toluene, xylene, trichloroethylene, and both aliphatic and aromatic mineral spirits. If desired, the resinous copolymer of $SiO_2$ units and $R_3SiO_{0.5}$ units can be formed from a reaction mixture including a first organic solvent and this solvent can be evaporated from the resinous copolymer to produce a powdery, resinous copolymer. The powdery, resinous copolymer can then be redissolved in a different organic solvent, again using any of the common hydrocarbon solvents. In the present invention, the amount of hydrocarbon solvent in which the resinous copolymer is dissolved can vary within extremely wide limits, satisfactory results being obtained with solutions of the resinous copolymer containing from 10% to 90% solids. However, it is often desirable to eliminate the solvent from the resinous copolymer, entirely, to avoid the problems of solvent evaporation during curing and insure a homogeneous film.

The $R_3SiO_{0.5}$ units present in the resinous copolymer are generally those in which the R groups are methyl groups. However, also applicable to the present invention are those $R_3SiO_{0.5}$ units in which the R groups are other monovalent hydrocarbon radicals such as, alkyl radicals, e.g., ethyl, propyl, butyl, octyl, etc.; aryl radicals, e.g., phenyl, naphthyl, xylyl, tolyl, etc.; aralkyl radicals, e.g., benzyl, phenethyl, etc.; and cyclic hydrocarbon radicals, such as, for example, cyclohexyl, cycloheptyl, cyclopentyl, etc. Preferably, where radicals other than methyl radicals are included in the $R_3SiO_{0.5}$ units, the units also contain at least 50% of trimethylsiloxane units.

The alkyl orthosilicates employed in the practice of the present invention have the formula:

(1)          $(R'O)_4Si$ where R' is a lower alkyl radical or a lower hydroxy alkyl radical, such as, methyl, ethyl, propyl, butyl, octyl, hydroxyethyl, etc. Preferably, the alkyl orthosilicate employed is ethyl orthosilicate or the partial hydrolysis product thereof.

In some cases, it has been found desirable to hydrolyze the triorganohydrolyzable silane used in forming the resinous copolymer of $R_3SiO_{0.5}$ units and $SiO_2$ units, and then react this material with tetrachlorosilane, rather than forming the resinous copolymer by the cohydrolysis of a triorganohydrolyzable silane and an alkyl orthosilicate. For example, a trialkylchlorosilane can be dissolved in ether in an amount of about two parts, by weight of ether, per part of silane. The ether solution of the silane is then added to water chilled to about 0° C. while, at the same time, adding ammonium hydroxide to the water so as to maintain neutrality. After completion of the addition, the now hydrolyzed silane is dissolved in the ether layer which is removed from the remaining water. The hydrolyzed silane, in the ether, is added to a stirred quantity of silicon tetrachloride, the quantity being determined by the desired ratio of $R_3SiO_{0.5}$ units to $SiO_2$ units in the copolymeric resin. The mixture containing the reaction product of the hydrolyzed trialkylsilane and the silicon tetrachloride is dissolved in an aromatic hydrocarbon solvent, such as toluene, and is then alcoholized with a lower alkyl alcohol. An amount of water, in excess of that needed to hydrolyze the alkoxy groups formed in the previous step is then added to completely hydrolyze the material and form the copolymeric resin containing $R_3SiO_{0.5}$ units and $SiO_2$ units which contains a portion of silicon-bonded hydroxyl groups. The ether can then be removed from the resin solution, leaving a toluene solution of the copolymeric resin, or both the ether and the toluene can be removed to leave a viscous fluid.

The silanol-terminated diorganosiloxane polymers which are employed in the present invention are also well known in the art and have the formula:

(2) 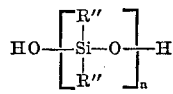

where R" is a monovalent hydocarbon radical and $n$ has a value of at least 500. These silanol-terminated diorganosiloxane polymers are described, for example, in Pat. 2,843,555—Berridge, that portion of that patent being herein incorporated by reference. Preferably, the silanol-terminated diorganosiloxane polymer is a gum wherein $n$ is at least 2500, corresponding to a viscosity of approximately 6,000,000, or a penetration of less than about 2500. The penetration is measured in 0.1 mm./min. using A.S.T.M. Standard Test No. D–217–60 T with a modified plunger or foot. The silanol-terminated diorganosiloxane polymer can also be in a solvent solution, the solvent being selected from the same group as that previously described for dissolving the resinous copolymer of $R_3SiO_{0.5}$ units and $SiO_2$ units.

The resinous copolymer and the silanol-terminated diorganosiloxane polymer can be mixed together in any convenient fashion. The resin and the silanol-terminated diorganosiloxane polymer are completely miscible, so that a uniform, homogeneous solution can be obtained upon mixing. However, the solubility of the two ingredients does vary to some extent, depending upon the amount of solvent present, so that mixing for several minutes may be required to form a completely homogeneous solution. The proportions of the resinous copolymer and the silanol-terminated diorganosiloxane polymer can vary within wide limits. However, for optimum results, to obtain the toughest films, there should be from one to six parts of the silanol-terminated diorganosiloxane polymer for each part of the resinous copolymer of $R_3SiO_{0.5}$ units and $SiO_2$ units.

The tough film of the present invention is most suitably formed by casting it from a solvent solution, the solvent being selected from those previously described. However, solvent is not necessary for forming the film. Prior to casting, an amount of tin octoate is added to catalyze the condensation of the silanol-terminated diorganosiloxane polymer and the resinous copolymer of $R_3SiO_{0.5}$ units and $SiO_2$ units. This catalyst is generally used in an amount equal to from about 0.01 to 2%, by weight of the metal, for each part of the total of the silanol-terminated diorganosiloxane polymer and resinous copolymer of $R_3SiO_{0.5}$ units and $SiO_2$ units.

After the catalyst has been added, the blend of siloxane polymers is applied to a surface upon which the film can be formed. Among suitable surfaces are tin, glass, steel or other material which will easily release the formed film. The film is allowed to cure, and is then peeled from the surface. One application for the films of the present invention is in the formation of molds for intricately-shaped articles. In this application, for example, a film can be cast over a sculpted article using the solution made according to this invention. After the film has set, it can be peeled from the sculpted article, retaining every detail of the sculpture, and used to cast additional articles which will be substantial duplicates of the first. Further, because of the toughness of the films formed according to the present invention, they can be used in the formation of tight-fitting rubber gloves, such as surgical gloves. A mold of a hand can be dipped into the solvent solution, formed as described above, several times to form a coating of the desired thickness on the mold. The glove, thus formed, can be peeled from the mold, and will cling tightly to the hand. Because of the great toughness of the polymer formed, this glove has a greater resistance to tearing than the gloves presently in use. Additionally, due to the inherent inertness of materials formed from organopolysiloxanes, these gloves are ideally suited for surgical use. Similarly, the films can be used to encapsulate artificial body members, such as artificial hearts.

The following examples are illustrative of the practice of the present invention and should not be considered as limiting in any way the full scope of this invention, as covered in the appended claims. All parts in these examples are by weight.

EXAMPLE 1

A quantity of about 40 parts of water and ice was placed into a stirred reaction vessel. To the vessel were added, simultaneously, a solution of about 108 parts of trimethylchlorosilane in 110 parts of ethyl ether and 115 parts of a 28% solution of ammonium hydroxide over a period of about 60 minutes, so that the solution remained neutral and at about 0° C. After stirring for a period of about 5 minutes, agitation was stopped and the mixture in the reaction vessel was allowed to settle into two layers. The upper ether layer containing the hydrolyzed silane was added to a quantity of 170 parts of silicon tetrachloride contained in an agitated reaction vessel. The mixture was kept cold and a quantity of 300 parts of toluene added. A quantity of 110 parts of methanol was then added to alkoxylate the compound formed by the addition of the hydrolyzed trimethylchlorosilane to the silicon tetrachloride and this mixture was agitated for approximately 30 minutes. Following agitation, 100 parts of water were added to hydrolyze the methoxy groups formed by the methanol addition and the final resin was then agitated for 30 minutes. The resin, consisting of $Me_3SiO_{0.5}$ units and $SiO_2$ units, in a ratio of 1:1, in toluene-ether, was removed from the water-alcohol layer. The solvent was then stripped from the formed resin. A portion of the formed resin, 100 parts, was stirred into 100 parts of a silanol-terminated dimethylpolysiloxane fluid, having the approximate average formula:

(3) 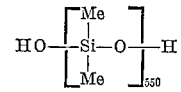

where Me is the methyl group, having a viscosity at 25° C. of approximately 3,000 centistokes. A quantity of 8 parts of tin octoate catalyst, equivalent to about 2.25 parts of tin metal, was blended into the resinous copolymer-silanol-terminated dimethylpolysiloxane mixture and the catalyzed mixture was poured onto a tin surface and allowed to cure for 24 hours at room temperature, and given a post cure of two hours at 150° C. Following cure, a strip 56 mils wide and 80 mils long was cut from the 20 mil sheet which was formed. On testing on an Instron machine, this strip, pulled at 12 inches per minute, showed a tensile strength of 1733 p.s.i. and an elongation of 210%, equivalent to a toughness value of 182,000.

EXAMPLE 2

A resinous copolymer consisting of $Me_3SiO_{0.5}$ units and $SiO_2$ units was prepared by the same method, using the same proportions, as in Example 1. The solvent was evaporated from the resinous copolymer and a quantity of 200 parts of the resinous copolymer was mixed with 300 parts of the silanol-terminated dimethylpolysiloxane described in Example 1. A quantity of 13 parts of tin octoate, equivalent to approximately 3.75 parts of metallic tin, was blended into the mixture. A 20 mil thick sheet was formed from the mixture on a tin surface and was allowed to cure for about 24 hours at room temperature, with a post cure of two hours at 150° C. Following cure, the sheet was removed from the plate and a strip 56 mils wide by 80 mils long was cut from the sheet and placed on an Instron machine. At a pull of about 12 inches per minute, the strip showed a tensile strength of 1340 p.s.i. and an elongation of 175%, equivalent to a toughness value of 117,800.

EXAMPLE 3

A resinous copolymer consisting of about 0.77 Me$_3$SiO$_{0.5}$ units for each SiO$_2$ unit was prepared according to the method described in the aforementioned patent to Goodwin. A quantity of 15 parts of this resinous copolymer was blended with 90 parts of a silanol-terminated diorganopolysiloxane gum having the approximate average formula:

(4) 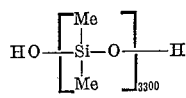

where Me is the methyl radical, contained in a concentration of 30% in toluene. The dimethylsiloxane polymer was a gum with a penetration of approximately 2,000. To the blend was added 0.44 part of tin octoate, equivalent to 0.12 part of metallic tin, and the blend was placed on a tin sheet and cured at 65° C. for a period of 18 hours. A strip ¼ inch wide by 3 inches long was cut from the sheet, which had a thickness of about 20 mils. The strip was tested on an Instron machine by pulling at about 12 inches per minute and was found to have a tensile strength of 950 p.s.i. and an elongation of 1600%, equivalent to a toughness of 760,000.

EXAMPLE 4

A sheet was prepared in the same manner as in Example 3 except that 30 parts of the resinous copolymer of Me$_3$SiO$_{0.5}$ unit and SiO$_2$ units was used with 90 parts of the silanol-terminated dimethylpolysiloxane material. On testing, this strip showed a tensile strength of 1300 pounds per square inch and an elongation of 1300%, equivalent to a toughness of 840,000.

EXAMPLE 5

Another sheet was cast from a material formed according to the method described in Example 3. In this case 45 parts of the resinous copolymer of Me$_3$SiO$_{0.5}$ units and SiO$_2$ units in a ratio of 0.77:1 was blended with 90 parts of the silanol-terminated dimethylpolysiloxane of formula (4) contained in the toluene solvent. A ¼" x 3" strip of the sheet formed from this mixture showed a tensile strength of 1325 p.s.i. and an elongation of 1500%, equivalent to a toughness of 995,000.

EXAMPLE 6

The same materials were used in this example as in Examples 3–5, except that 60 parts of the resinous copolymer of Me$_3$SiO$_{0.5}$ units and SiO$_2$ units was used for each 90 parts of the silanol-terminated dimethylpolysiloxane of Formula 4. This material showed a tensile strength of 940 pounds per square inch and an elongation of 1300%, equivalent to a toughness of 610,000, when the ¼" x 3" strip was tested on the Instron machine.

EXAMPLE 7

A quantity of 90 parts of the same resinous copolymer as described in Example 3 was blended with 180 parts of a silanol-terminated dimethylpolysiloxane gum having the approximate average formula:

(5) 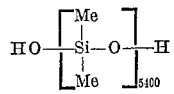

where Me is again the methyl group. This gum had a penetration of approximately 1,000. Tin octoate, in an amount of 0.44 part, equivalent to about 0.125 part of tin metal, was blended into the resinous copolymer-silanol-terminated dimethylpolysiloxane gum mixture and the catalyzed mixture was placed on a tin surface and cured for 18 hours at 65° C. A ¼" x 3" strip was cut from the 20 mil. thick sheet and the strip was tested on an Instron machine at a pull of 12 inches per minute. The strip cut from the sheet showed a tensile strength of 1230 p.s.i. and an elongation of 1350%, equivalent to a toughness value of 830,000.

EXAMPLE 8

A catalyzed mixture is formed equivalent to that described in Example 4. A ceramic form, simulating a human hand, is dipped into the catalyzed solvent mixture of silanol-terminated dimethylpolysiloxane and resinous copolymer of Me$_3$SiO$_{0.5}$ units and SiO$_2$ units three times. Between each of the dips, and following the last dip, the form is heated for about 4 hours at about 50° C. After the last heating, the coated form is cooled, and the resulting organopolysiloxane glove is stripped from the form. This glove has not only the inertness inherent in organopolysiloxanes, but the extreme toughness of the system described in the present invention.

It should be clear to those skilled in the art that the ratio of resinous copolymer to silanol-terminated diorganosiloxane polymer and ratio of R$_3$SiO$_{0.5}$ units to SiO$_2$ units in the resinous copolymer can be varied within the limits previously described. Valuable, tough polymeric films are formed within these ranges. As a comparison with the toughness of the films formed according to the present invention, a very high molecular weight dimethylsiloxane gum, cured by a peroxide catalyst, has a toughness value of about 500,000. Similarly, a polysiloxane copolymer containing methyl, phenyl, and vinyl substituents, cured with a peroxide catalyst, has a toughness of 100,000. Additionally, typical materials cured by hydrosoliation reactions have toughnesses of about 75,000, while a typical room temperature vulcanizing polymer has a toughness in the range of 60,000.

What we claim as new and desire to secure by Letters Patent of the United States is:

1. An unsupported organopolysiloxane film having a high toughness value, and a tensile strength of greater than 900 p.s.i., the film being formed by the condensation of a silanol-terminated diorganosiloxane polymer having the structure,

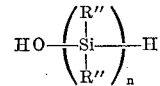

and a resinous copolymer composed of R$_3$SiO$_{0.5}$ units and SiO$_2$ units where R is a monovalent hydrocarbon radical and R" is a monovalent hydrocarbon radical where $n$ has a value of at least 2500, the ratio of R$_3$SiO$_{0.5}$ units to SiO$_2$ units in the resinous copolymer is in the range of 0.77:1 to 1:1 and the weight ratio of the silanol-terminated disorganosiloxane polymer to the resinous copolymer of R$_3$SiO$_{0.5}$ units to SiO$_2$ units is in the range of 1:1 to 6:1.

2. The film of claim 1 wherein the silanol-terminated diorganosiloxane polymer is a dimethylpolysiloxane gum having the approximate average formula:

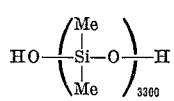

and the resinous copolymer is composed of Me$_3$SiO$_{0.5}$ units and SiO$_2$ units in a ratio of 0.77:1, where Me is the methyl radical.

3. The film of claim 1 wherein the silanol-terminated diorganosiloxane polymer is a dimethylpolysiloxane gum having the approximate average formula:

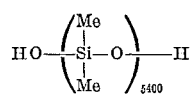

and the resinous copolymer is composed of $Me_3SiO_{0.5}$ units and $SiO_2$ units in a ratio of 0.77:1, where Me is the methyl radical.

References Cited
UNITED STATES PATENTS

| | | | |
|---|---|---|---|
| 2,970,126 | 1/1961 | Brown | 260—825 |
| 3,017,384 | 1/1962 | Modic | 260—825 |
| 3,057,469 | 10/1962 | Bond et al. | 260—825 |
| 3,205,283 | 9/1965 | Modic | 260—825 |
| 3,457,214 | 7/1969 | Modic | 260—825 |

SAMUEL H. BLECH, Primary Examiner

U.S. Cl. X.R.

3—1; 117—124, 132, 161; 260—18, 46.5; 264—220